United States Patent

Krezanoski et al.

[15] 3,645,284
[45] Feb. 29, 1972

[54] CONTACT LENS HOLDING DEVICE

[72] Inventors: Joseph Z. Krezanoski; John C. Petricciani, both of Los Altos, Calif.

[73] Assignee: Flow Pharmaceuticals, Inc., Mountain View, Calif.

[22] Filed: Feb. 20, 1970

[21] Appl. No.: 12,921

Related U.S. Application Data

[63] Continuation-in-part of Ser. No. 748,277, July 29, 1968, Pat. No. 3,519,005.

[52] U.S. Cl. ..........................................134/166 R, 206/5 A
[51] Int. Cl. ..........................................B08b 11/02
[58] Field of Search ..............134/82, 137, 156, 158, 166 R, 134/201; 21/83, 87, 90; 206/5 A; 220/23.83, 23.86

[56] References Cited

UNITED STATES PATENTS

| | | | |
|---|---|---|---|
| 3,379,200 | 4/1968 | Pennell | 134/143 |
| 2,706,992 | 4/1955 | Freidman et al. | 134/158 X |
| 3,250,283 | 5/1966 | Reinfeld | 134/166 R X |
| 3,460,552 | 8/1969 | Sturgeon | 134/143 X |
| 3,052,246 | 9/1962 | Beard | 206/5 A X |
| 3,101,087 | 8/1963 | Watson | 134/156 R X |
| 2,512,747 | 6/1950 | Lewis | 21/83 |
| 2,721,567 | 10/1955 | Tierney | 134/158 |

FOREIGN PATENTS OR APPLICATIONS

| | | | |
|---|---|---|---|
| 631,248 | 12/1961 | Italy | 206/5 A |
| 1,035,074 | 4/1953 | France | 220/23.83 |

Primary Examiner—Daniel Blum
Attorney—Finnegan, Henderson & Farabow

[57] ABSTRACT

A device for holding a pair of contact lenses comprises means, including a pair of substantially identically shaped elements, forming a pair of axially aligned lenses holding compartments, each of the elements including a base provided with openings to permit fluid flow through both of the lenses holding compartments, a displaceable cover for each compartment to releasably confine the lenses in the compartments, each cover having perforations to permit fluid to flow into and from the lenses holding compartments, and coupling means for axially aligning the identically shaped elements with the bases of the elements in abutting relationship to permit fluid to flow into and through both of the lenses holding compartments. The device conveniently and safely holds the lenses during cleaning under running tapwater or during immersion in a lens treating solution.

9 Claims, 5 Drawing Figures

PATENTED FEB 29 1972 3,645,284

INVENTORS
JOSEPH Z. KREZANOSKI
JOHN C. PETRICCIANI

Finnegan, Henderson & Farabow

ATTORNEYS

PATENTED FEB 29 1972

INVENTORS
JOSEPH Z. KREZANOSKI
JOHN C. PETRICCIANI

Finnegan, Henderson & Farabou
ATTORNEY

CONTACT LENS HOLDING DEVICE

This application is a continuation-in-part of our copending application, Ser. No. 748,277, filed July 29, 1968, and entitled "Contact Lens Cleaning and Storage Device," now U.S. Pat. No. 3,519,005, issued July 7, 1970.

This invention relates to equipment for contact lenses, and more particularly to a device for holding a pair of contact lenses.

A variety of contact lens cleaning and storing devices have been provided in the past for the maintenance and proper care of contact lenses. While these devices, including both separate and combination devices, have solved some of the problems involved in the storing and cleaning of contact lenses, the devices are often too bulky to conveniently carry on the person and their use frequently involves a rather complicated procedure.

Separate cleaning and storage devices, for example, require the wearer to manually grasp the lenses to transfer the lenses from the cleaning device to the storage device and vice versa. For contact lens wearers, however, such a procedure is inconvenient, because the small size of the lenses and their wetted condition make them difficult to grasp securely and expose the lenses to frequent opportunities for damage or loss due to scratching, dropping, or misplacing the lenses. While combined cleaning and storage devices eliminate the problems of manual transfer, the devices that have heretofore been provided are too bulky to permit the device to be conveniently carried in the wearer's pocket or purse. Further, such large, bulky devices require the use of large volumes of lens treating solution, and because recommended use requires frequent change of the solution, such devices are not economical.

Manual handling problems also occur in contact lens care when the lenses are rinsed in running tapwater, usually while holding the lens between the fingers. Often the rinsing is inadequate because of the patient's fear of dropping or losing the lens.

Because of the complicated and inconvenient cleaning, transfer, and storage procedures required when using presently available contact lens storage and cleaning units, many patients occasionally or systematically disregard the contact lens fitter's instructions on the use of these devices and expose their lenses to improper care and potential damage. Of even more consequence than possible damage to the lenses, is the potential discomfort, irritation, and even infection of the eye that can be directly caused by a patient's attempts to simplify the procedure for cleaning and storing the lenses.

In addition, most contact lens storage cases that have been provided do not always provide for complete immersion of the lenses in a lens treating solution which is necessary to keep the lenses in a hydrated condition and to cleanse the lenses of undesirable organic, inorganic, and proteinaceous material that have been adsorbed on the lens surfaces from the eye.

Accordingly, the present invention provides a device for conveniently and safely holding a pair of contact lenses that permits the wearer to clean, store and transfer his lenses in a simple, convenient, and trouble-free manner and thereby minimize damage to the lenses and discomfort or irritation to the eye. The invention contemplates a device for holding the pair of contact lenses that may be inserted in a fluidtight container to immerse the lenses in a lens treating solution that may be used to conveniently transfer the lenses between cleaning and storage solutions and that may be held in a stream of running tapwater to rinse the lenses.

As embodied and broadly described, the invention provides a device for holding a pair of contact lenses which comprises means including a pair of substantially identically shaped elements forming a pair of axially aligned lens holding compartments, each of the elements including a base having openings therein to permit fluid to flow through both of the lens holding compartments, a displaceable cover for each compartment to releasably confine the lenses in the compartments, each cover having perforations therein to permit fluid to flow into and from the lens holding compartments, and coupling means for axially aligning the identically shaped elements with the bases of the elements in abutting relationship to permit fluid to flow into and through both of the lens holding compartments.

It is to be understood that both the foregoing general description and the following detailed description are exemplary and explanatory but are not restrictive of the invention.

The accompanying drawings, which are incorporated in and constitute a part of this invention, illustrate a preferred embodiment of the invention, and together with the description serve to explain the principles of the invention.

Figure 1:
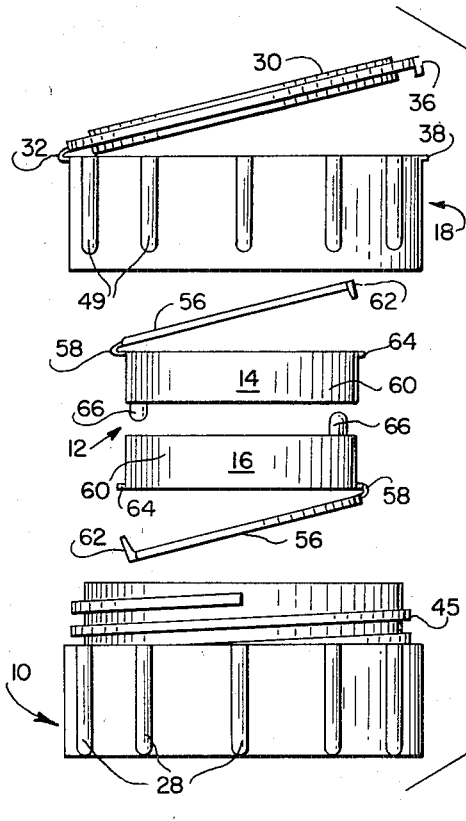
FIG. 1 is an exploded side elevation view of the elements of a cleaning and storage device which includes the lens holding device of this invention.

Referring to FIG. 1, there is shown a complete contact lens cleaning and storage device including a cup-shaped base, generally 10; the lens holding device of the present invention, generally 12; and a cap, generally 18. When the cleaning and storage device is assembled, base 10 and cap 18 form a liquid-tight container that encloses lens-holding device 12.

The container, as well as lens-holding device 12, can be made from a variety of metal or plastic materials that have sufficient rigidity and resistance to abrasion to enable the container and the device to be carried in a pocket or purse, and resistance to corrosive action by the usual water-based lens cleaning and storage solutions. Polypropylene, polyethylene, and other synthetic organic polymeric materials that can be easily molded, are preferred materials of construction. It is desirable that the lens holding device be of a material that is softer than the contact lenses to avoid abrasion of the lenses.

In the complete cleaning and storage device shown in FIG. 1, which is described in more detail and claimed in our copending application, Ser. No. 748,277, supra, base 10 serves as a receptacle for liquids and particularly lens treating solutions, and cooperates with cap 18 to provide a fluidtight container. Base 10 is cylindrical and forms an open-topped receptacle for the solution. Preferably, the height and inside diameter of the receptacle slightly exceed the height and largest transverse dimension of lens holding device 12 to permit its insertion into the receptacle. As best shown in FIG. 1, the lower portion of the outer sidewalls of base 10 has a plurality of circumferential ridges 28 that permit the user to firmly grasp base 10 while disengaging cap 18.

Cap 18 is also cylindrical and provides a closure for the open-topped receptacle provided by base 10. A lid 30 is hinged at 32 to the outer side of cap 18 and includes a snap 36 that engages a ridge 38 on cap 18 to lock the lid in a closed position. A mirror (not shown) can be secured to the inside surface of lid 30, or in the alternative, the mirror can be located on the upper surface of cap 18.

For removably interconnecting cap 18 to base 10 to form a liquidtight container, interior screw threads (not shown) are formed on the lower portion of the interior sidewalls of cap 18 and mating exterior screw threads 45 (FIG. 1) are formed on the upper portion of the sidewalls of base 10. An O-ring seal (not shown) can be provided on the interior surface of cap 18 to provide a liquidtight seal with the top surface of the threaded portion of base 10. When cap 18 is tightly twisted onto base 10, the O-ring seal is compressed and effectively seals the liquid in the interior of the container.

As shown in FIG. 1, the outer surface of the sidewalls of cap 18 also has a plurality of circumferential ridges 49 that permit the user to firmly grasp the cap and twist it with respect to base 10.

In accordance with the present invention the lens-holding device 12, which is for holding a pair of contact lenses suitable for use either in combination with the above-described container or by itself, includes means forming a pair of axially aligned lens holding compartments.

Figure 2:
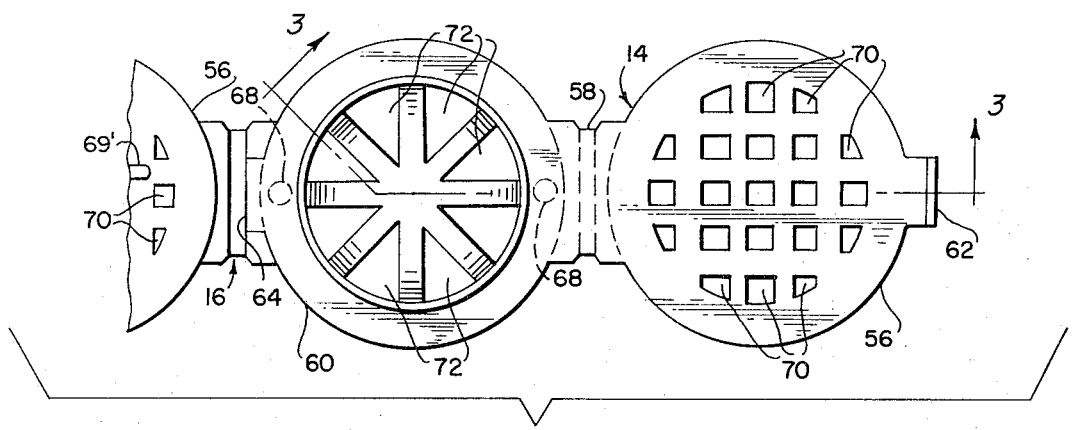
FIG. 2 is a top plan view of one end of the lens holding device showing the pair of lids of the device in an open position.
Figure 3:
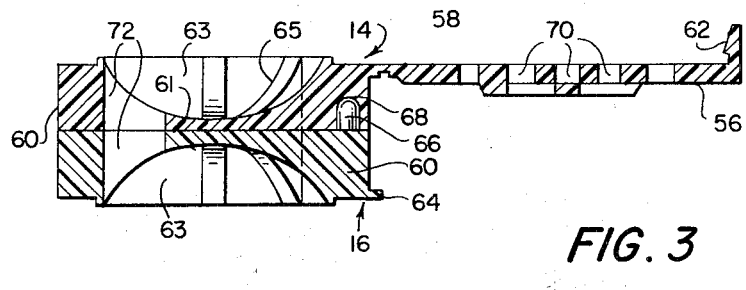
FIG. 3 is a sectional view taken along line 3—3 of FIG. 2.

As embodied, and as best shown in FIGS. 2 and 3, the means comprises an outer cylindrical wall 60 forming a hollow chamber and a platform 61 located across the chamber perpendicular to its axis and midway of its length. Platform 61 and cylindrical wall 60 form a pair of separate and axially aligned lens holding compartments 63. Preferably, the upper and lower surfaces of platform 61 are dish-shaped to form a cradle for receiving the convex surfaces of the lenses.

A displaceable cover or lid 56 (FIG. 2) is provided for each compartment that is hinged at 58 to wall 60 to releasably confine the lenses in the compartments. In a preferred embodiment of the invention, means are provided for securing lids 56 in closed or locked positions. As embodied, this securing means comprises a snap 62 on each lid 56 positioned opposite the hinge to frictionally engage a ridge 64 on wall 60 to secure the lids in locked positions.

Preferably, and as best shown in FIGS. 1 and 3, the lens holding device 12 is constructed of two similar elements, generally 14 and 16, each of which is capable of holding one contact lens. As shown in FIG. 3, the base of each element comprises one-half of platform 61, and the sidewalls of each element comprise one-half of wall 60. When the bases of the elements are placed in abutting relationship, a two-compartment lens holding device is provided. The lens holding device of this invention includes coupling means for axially aligning the elements with the bases of the elements in abutting relationship. As shown in FIG. 3, coupling or securing means, such as prongs 66 and detents 68, are provided on the adjoining surfaces of the bases of each element 14 and 16 to frictionally hold the elements together.

Figure 4:
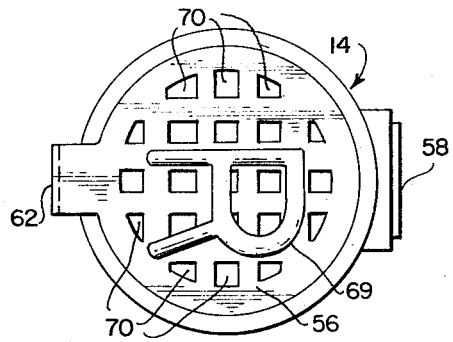
FIGS. 4 and 5 are plan views of opposite ends of the lens holding device showing the lids in a closed position.
Figure 5:
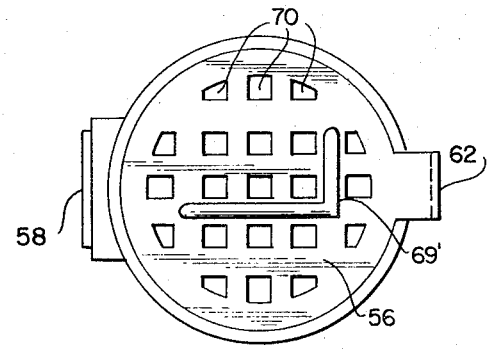

In accordance with a preferred embodiment, the displaceable covers are provided with indicia thereon for identifying lenses which are inserted in the lens holding compartments. As seen in FIGS. 4 and 5, a raised letter "R" 69, or "L" 69', is provided on the outer surface of each lid 56 to provide for tactile identification of the lens compartments. The left and right lens compartments can also be differentiated by color. The two-part construction of the device permits molding elements 14 and 16 of different colors and this two-color construction provides positive visual means of identification that permits contact lens wearers to readily distinguish one lens compartment from the other. Two-part construction of the device thus represents a preferred embodiment of this invention. It will readily be apparent to those skilled in the art, however, that the lens-holding device 12 can be of one-piece construction instead of the two-part construction shown in the drawings without departing from the scope of this invention.

In accordance with the invention, conduit means are provided in the lens holding device to serially interconnect the outer surfaces of both lids with both lens compartments to permit fluid to flow into and through both of the lens holding compartments. Thus, when the device is inserted into a container such as the one provided by base 10 and cap 18, the lens treating solution in the container can flood the lenses retained in the lens compartments and when the device is removed from the container, a fluid can be forced through it to clean or rinse the lenses. Preferably, the conduit means extend in the axial direction of the lens holding device so that large volumes of water can be flushed through it simply by placing the outer surface of either lid 56 tightly against a tapwater orifice.

As best shown in FIGS. 2-5, the conduit means comprises a plurality of perforations 70 in each lid 56 and a plurality of arcuate openings 72 in platform 61. Preferably, openings 72 extend, in radially spaced relationship, out from the axis of the holding device a distance that exceeds the radius of a lens placed in the lens holding compartment to permit unobstructed flow of fluid through at least a portion of the cross section of each lens compartment.

The lens holding device of the present invention enables a patient to conveniently and safely hold his lenses during contact lens care and handling regimens. For example, in preparing the lenses for storage after removal from the eye, the following procedure can be followed. A few drops of good cleaning solution are applied over all the lens surfaces. One lens is first inserted into its proper compartment in the holding device 12, the lid closed, and the device is then inverted for receipt of the other lens. Lids 56 are locked in place by engaging snaps 62 on corresponding ridges 64 on the wall 60 of the case.

A forced spray of cool tapwater is then passed through the holding device by holding either lid 56 tightly against the nozzle of the running cool tapwater faucet. The rapid flow of large volumes of water through the device, which is possible due to the axially aligned perforations, permits efficient cleaning and rinsing of the lenses. After the rinsing operation has been completed, excess water is blotted from the device.

The device may then be inserted in the container shown in FIG. 1 or any other suitable storage container. With reference to the container shown in FIG. 1, for example, base 10 is filled with a cleaning and storage solution and cap 18, preferably having means for suspending the lens holding device therefrom, is screwed down tightly against base 10 to form a fluidtight container and to immerse the lenses in the solution.

Removal of the lenses from a storage case and preparation of the lenses for wearing is also a simple and convenient procedure. With reference to the container shown in FIG. 1, the lenses are removed by unscrewing cap 18 from base 10, inverting cap 18, and subsequently removing the lens holding device 12. The lenses, still confined in the lens holding device, are then rinsed with cool tapwater by again holding the device tight up against a water nozzle to create a forced spray through it. This operation insures removal of all cleaning and storage solution from the lenses. The individual lens can easily be removed from the device by first unsnapping one lid 56 and by placing a drop of wetting solution on the fingertip to facilitate removal of the lens from its compartment. The device is then inverted and the other lens removed in the same manner.

From the foregoing description, it is apparent that this invention provides a new and improved contact lens holding device for conveniently and safely holding a pair of contact lenses. The device is simple to use and is inexpensive to manufacture. Further, the device simplifies the handling of contact lenses during storage or transfer and improves the security of handling the lenses during a tapwater rinsing operation.

The invention in its broader aspects is not limited to the specific structure shown and described and departures may be made from such details without departing from the principles of the invention and without sacrificing its chief advantages.

What is claimed is:

1. A device for holding a pair of contact lenses, which comprises:
   means forming a pair of axially aligned lens holding compartments, said means comprising a pair of substantially identically shaped elements, each of said elements including a base having openings therein to permit fluid to flow through both of said lens holding compartments;
   a displaceable cover for each compartment to releasably confine the lenses in said lens holding compartments, each cover having perforations therein to permit fluid to flow into and from said lens holding compartments; and
   coupling means for axially aligning said identically shaped elements with the bases of said elements in abutting relationship to permit fluid to flow into and through both of said lens holding compartments.

2. The device of claim 1, wherein:
   said coupling means is formed on said bases of said elements.

3. The device of claim 1, which includes:
   means for securing each of the displaceable covers in a closed position.

4. The device of claim 1, wherein the displaceable covers are provided with indicia for identifying lenses which are inserted in the lens holding compartments.

5. A device for holding a pair of contact lenses, which comprises:

means forming a pair of axially aligned lens holding compartments, said means comprising a pair of substantially identically shaped elements, each of said elements including a base having openings therein and a sidewall forming a single lens holding compartment with said base, said openings permitting fluid to flow through both of said lens holding compartments; and a displaceable cover for each compartment to releasably confine the lenses in said lens holding compartments, each cover having perforations therein to permit fluid to flow into and from said lens holding compartments;

said pair of substantially identically shaped elements including means for securing the elements together so that the bases of each element abut with their openings aligned and form a platform.

6. A device for holding a pair of contact lenses, which comprises:

an outer wall forming a hollow chamber;

a platform mounted across said hollow chamber midway of its length to form a pair of axially aligned lens holding compartments within said hollow chamber;

said platform being shaped on opposite surfaces to conform to the contour of one surface of the lens and having openings interconnecting said pair of lens holding compartments; and a perforated lid for each lens holding compartment to releasably confine a lens in the compartment and to permit fluid to flow into and through the lens holding compartments.

7. A device for holding a pair of contact lenses, comprising:

two substantially identically shaped elements, each of said elements including a base having openings therein, a sidewall forming a single lens holding compartment with said base, and a perforated lid to releasably confine a lens in each lens holding compartment, means for securing the elements together so that the bases of each element abut with their openings aligned, said sidewalls of the elements providing an outer wall forming a hollow chamber and said bases forming a platform mounted across said hollow chamber midway of its length to form a pair of axially aligned lens holding compartments within said hollow chamber.

8. A device for holding a pair of contact lenses which comprises:

an outer cylindrical wall forming a cylindrical hollow chamber;

a platform having concave upper and lower surfaces and mounted across said hollow chamber perpendicular to its axis and midway of its length to form a pair of dish-shaped lens holding compartments within said chamber;

said platform having a plurality of arcuate-shaped openings extending radially outward from the axis of said chamber and interconnecting the lens holding compartments; and a perforated lid for each lens holding compartment to releasably confine a lens in the compartment and to permit fluid to flow into and through the lens holding compartments.

9. The device of claim 8, wherein:

said perforated lids have indicia thereon for identifying a lens in the respective lens holding compartment.

* * * * *